United States Patent [19]

Barling et al.

[11] Patent Number: 4,480,358
[45] Date of Patent: Nov. 6, 1984

[54] TIE STRUCTURE

[76] Inventors: Donald E. Barling, 635 #3 N. Chipewa Ave., Anaheim, Calif. 92801; John W. Barling, Westlawn, Hisperia Mobile Estates, Hisperia, Calif. 92345

[21] Appl. No.: 446,587

[22] Filed: Dec. 2, 1982

[51] Int. Cl.³ .................... F16G 11/00; B65D 63/00
[52] U.S. Cl. .................... 24/115 G; 24/17 B; 24/115 K; 24/118; 24/129 B; 403/209; 403/213; 248/493
[58] Field of Search ............ 24/115 G, 115 H, 115 K, 24/118, 115 J, 30.5 R, 30.5 S, 129 B; 248/492, 493; 403/209, 213

[56] References Cited

U.S. PATENT DOCUMENTS

| 265,025 | 9/1882 | Cook | 403/213 |
| 561,388 | 6/1896 | Gartner | 403/213 |
| 708,049 | 9/1902 | Jordan | 24/115 G |
| 826,687 | 7/1906 | Peirce, Jr. | 403/213 |
| 861,728 | 7/1907 | Hutchens | 403/213 |
| 987,407 | 3/1911 | Scott | 24/30.5 S |
| 1,028,104 | 6/1912 | Fletcher | 24/115 K |
| 1,613,635 | 1/1927 | Zimmerlund | 24/129 B |
| 2,326,693 | 8/1943 | Sindler | 24/17 B |
| 3,353,228 | 11/1967 | Kish et al. | 24/118 |
| 3,409,014 | 11/1968 | Shannon | 24/129 B |
| 4,034,443 | 7/1977 | Turner | 24/129 B |
| 4,105,349 | 8/1978 | Kupperman et al. | 403/209 |

FOREIGN PATENT DOCUMENTS

| 446288 | 3/1949 | Italy | 403/209 |
| 27071 | of 1914 | United Kingdom | 248/492 |

Primary Examiner—Victor N. Sakran
Attorney, Agent, or Firm—William C. Babcock

[57] ABSTRACT

A rigid tie capable of being removably mounted on an end portion of an elongate pliable member such as a bungee cord that has a resilient core covered with a woven fabric, with the tie when so mounted serving as an anchor. A pair of the ties may removably engage opposite end portions of a pliable member to form an endless loop that is adjustable as to length by sliding the pair of ties towards or away from one another. A single tie if desired may be utilized to removably join the end portions of two elongate pliable members together.

4 Claims, 11 Drawing Figures

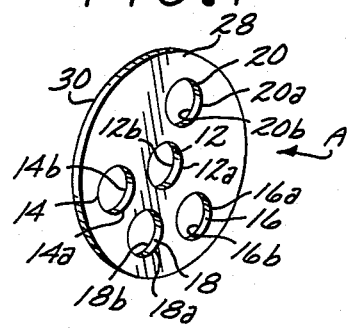
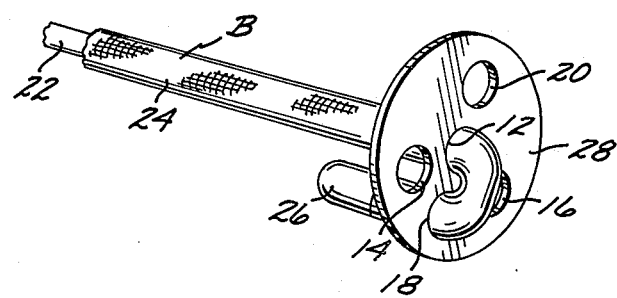
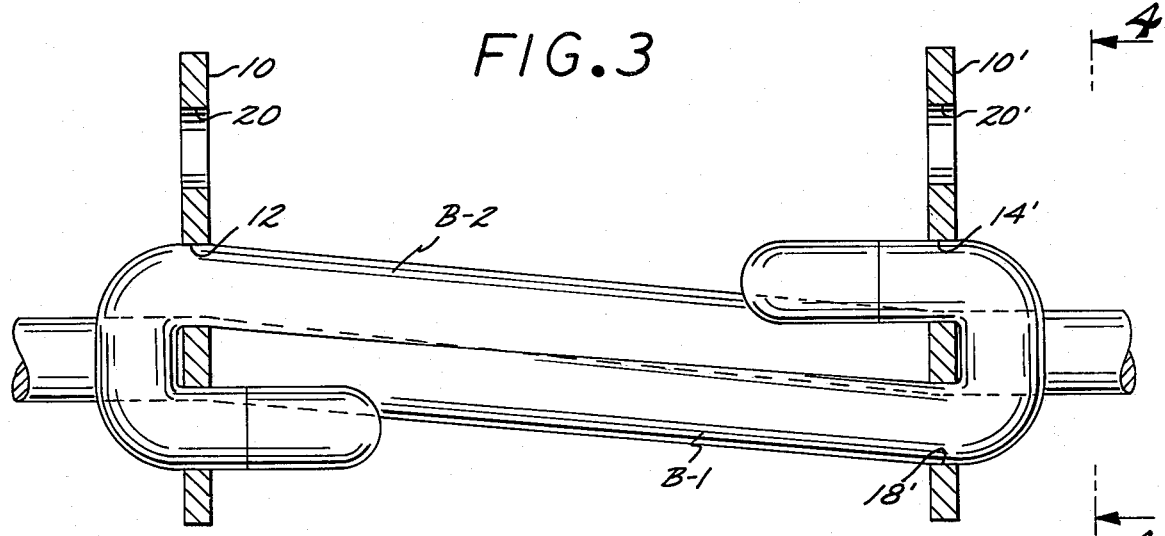
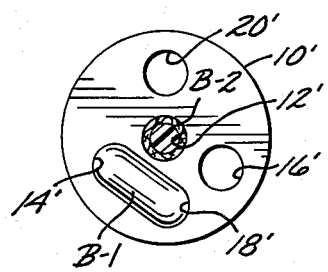
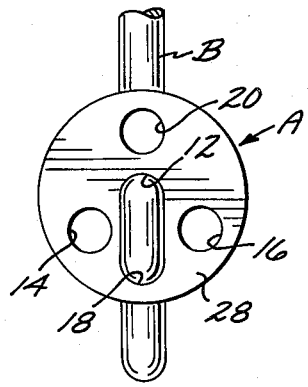
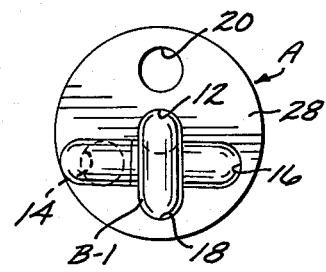
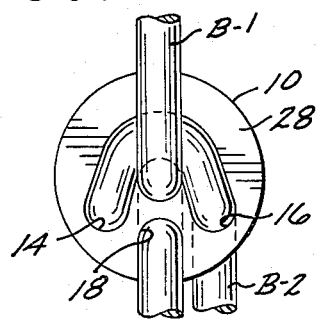
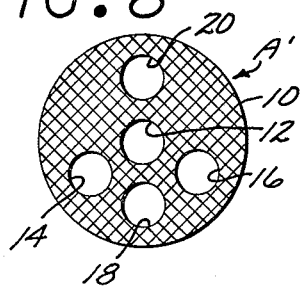
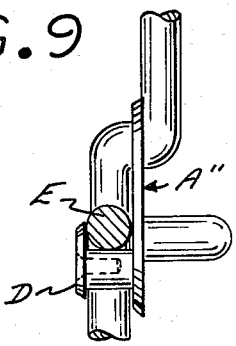

TIE STRUCTURE

DESCRIPTION OF THE PRIOR ART

In camping, hunting, boating, fishing and other sport activities, as well as in domestic and commercial situations, it is desirable to anchor the end portion of a line at a fixed location, join two lines together, or provide an endless loop that may be adjusted as to length to tightly encircle a desired object. In the past rigid securing means have been attached permanently to end portions of a line to permit the above operations to be achieved.

Such prior art securing means in the form of hooks or the like have the operational disadvantage that they may cause injury to a user by inadvertent forceful contact therewith, and also after prolonged usage the fastener may separate from the elongate member.

A major object of the present invention is to provide a tie structure that is removably secured to an end portion of an elongate pliable member, is of light weight structure, is inexpensive to produce, and one that will remain on the elongate member indefinitely due to the elongate member removably interlocking therewith.

These and other objects and advantages of the tie structure will become apparent from the following description of a preferred form thereof.

SUMMARY OF THE INVENTION

A light weight rigid sheet preferable in the form of a disk that has a centered opening therein through which an end portion of an elongate pliable member may be slid, and the disk having a member of radially and circumferentially spaced openings therein that bindingly engage portions of the elongate member that are curved to extend therethrough. By use of a single disk an anchor may be provided for an end portion of an elongate pliable member.

When two of the disks have the centered openings therein engaged by opposite end portions of an elongate member, and each end portion extended in a curved configuration through openings in the disk opposite that having the centered opening through which the elongate member extends to provide an endless loop that is adjustable to length by moving the disks towards or away from one another.

A single disk by proper selection of the openings therein for end portions of two separate elongate members may be used to removably join the two elongate members together.

Each disk should it be so desired may have an engageable member projecting outwardly therefrom that may be used to removably anchor the same to an inverted U-shaped rigid member or a down turned rib on the body of a truck bed or the like.

The above are merely illustrative of the numerous uses to which the ties of the present invention may be used.

DESCRIPTION OF THE DRAWINGS

FIG. 1 is a perspective view of one of the tie structures that has a first centered opening therein and a plurality of second openings that are radially and circumferentially spaced relative to the first opening;

FIG. 2 is the same view as shown in FIG. 1 but with an end portion of an elongate member extending through the first centered opening and then looped to extend rearwardly through one of the second openings, and the tie when so removably mounted on the elongate member serving as an anchor therefor;

FIG. 3 is a combined side elevational and cross sectional view of a pair of the ties that removably engage end portions of an elongate pliable member to define an endless loop that may be adjusted as to length by moving the pair of ties towards or away from one another;

FIG. 4 is an end elevational view of one of the tie structures taken on the line 4—4 of FIG. 3;

FIG. 5 is a side elevational view of one of the tie structures removably secured to an end portion of an elongate pliable member;

FIG. 6 is a side elevational view of the tie structure that is removably secured to an end portion of an elongate pliable member, but with the member engaging a greater number of the openings than that shown in FIG. 5;

FIG. 7 is a side elevational view of one of the tie structures removably joining the adjacent end portions of two separate elongate pliable members;

FIG. 8 is a perspective view of the tie structure shown in FIG. 1, but with at least one side surface having a light reflecting coating thereon;

FIG. 9 is an alternate form of the structure that includes means for removably engaging a U-shaped member or the like to anchor the tie thereto.

DESCRIPTION OF THE PREFERRED EMBODIMENT

Figure 10:
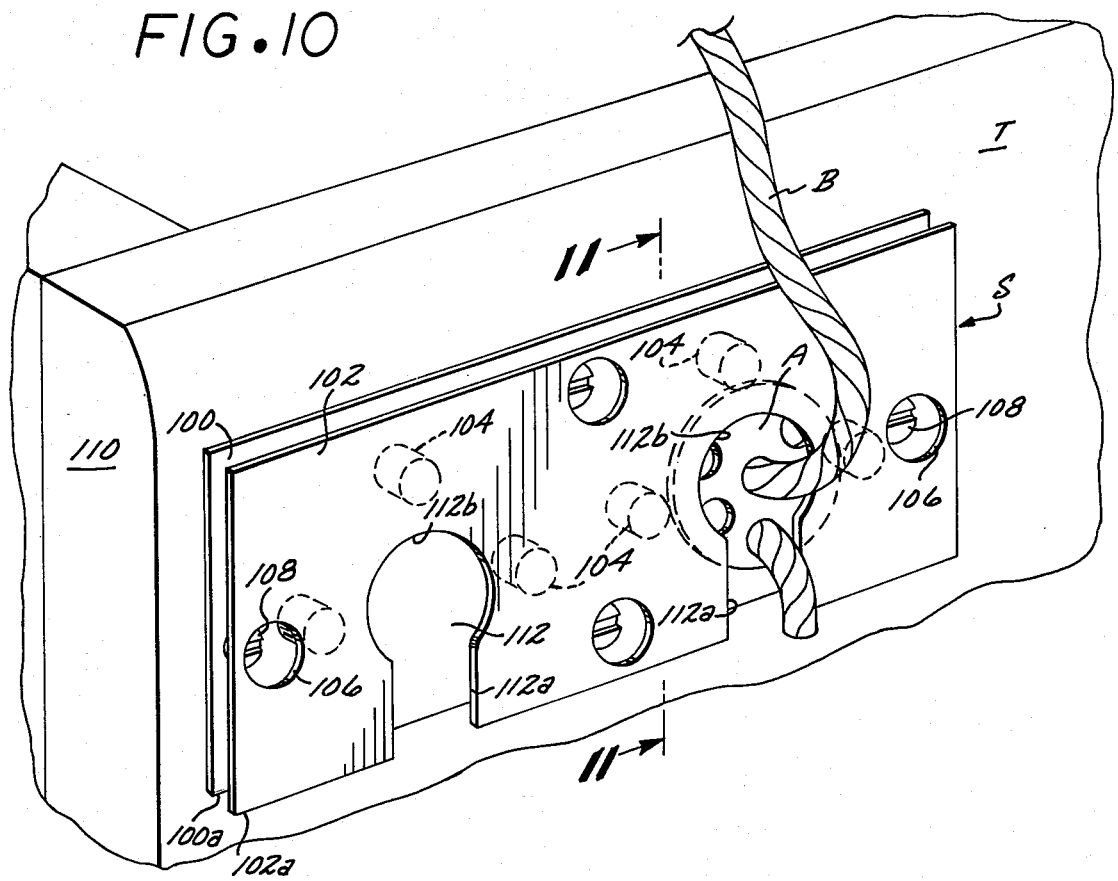
FIG. 10 is a perspective view of a tie engageable assembly.

The tie A of the present invention as may be seen in FIG. 1 is defined by a sheet of rigid material preferably in the form of a disk 10 that has a first centered opening 12 therein. The invention A is illustrated in FIG. 1 as including second, third and fourth circular openings 14, 16 and 18 that are circumferentially and radially spaced relative to the first opening 12, and may include a fifth opening 20 situated above the first opening 12.

The tie A is preferably used in conjunction with bungee type cord B that includes a resilient core 22, such as rubber or other elastomeric material, that is enveloped in a sheath 24 of woven fabric that will stretch when subjected to tension.

The first and fifth openings 12, 14, 16, 18 and 20 are of such diameter that the cord B is snuggly but slidably engageable therewith.

By baring an end section of the sheath 24 from the core 22 and heating the latter the end portion 26 of the core will assume a bullet shaped configuration as shown in FIG. 2 that permits easy insertion of the cord B through desired ones of the first to fifth openings 12, 14, 16, 18 and 20.

In FIG. 2 the tie A is shown as removably mounted in an anchored position on an end portion of the cord B. Each of the first to fifth openings 12, 14, 16, 18 and 20 is defined by a pair of spaced sharp circular edges 12a, 12b; 14a, 14b; 16a, 16b; 18a, 18b; and 20a, 20b; on opposite sides 28 and 30 of disk 10 as shown in FIG. 1.

The mounting of the tie A on an end portion of the cord B as shown in FIG. 2 is achieved by inserting the bullet shaped end portion through the first opening 12 and then looping the cord rearwardly through the third opening 18. When tension is applied to the section B-1 of the cord B in a direction away from the tie, the core 22 will elongate and the edge 12a will be forced into frictional gripping engagement with the edge 12a. The tie A is now removably anchored to the cord B, but is easily adjusted to a desired position thereon by increasing or decreasing the length of the looped portion in engagement with the disk 10.

In FIGS. 3 and 4 a second disk 10' identical to the first disk 10 cooperates with the latter to hold the cord B in the form of an endless loop that may be adjusted to length by moving the disks 10 and 10' towards or away from one another and relative to the cord B.

In this configuration a first end portion B-1 of the cord is extended through the first opening 12 of the first disk 10 and then through the fourth and second openings 18' and 14' of the second disk 10'. Elements of the second disk 10' are identified by the same numerals used on the first disk 10 but with primes added thereto. A second end portion B-2 is extended through the centered opening 12' of the second disk 10' and then looped through the fourth and second openings 18 and 14 of the first disk 10, all as shown in FIGS. 3 and 4.

In FIG. 5 the tie A is illustrated as removably secured in an anchored position to an end portion of the cord B by passing the cord through the first opening 10 downwardly over the first surface 28 and rearwardly through the fourth opening 18.

In FIG. 6 similar anchoring is achieved by passing an end portion of the cord B through first opening 12, over first surface 28, rearwardly through fourth opening 18, forwardly through third opening 16, and then transversely across the first surface 28 under the looped section B-1 of the cord.

In FIG. 7 two end portions B-1 and B-2 are illustrated as removably joined together by one of the ties A. The first portion B-1 extends downwardly over the surface 28, rearwardly through the first opening and then forwardly through the fourth opening 18 to extend downwardly therefrom. The second end portion B extends forwardly through the third opening 16, rearwardly of the section B-1 and then rearwardly through the second opening 14.

A modified tie A' is shown in FIG. 8 that has a light reflecting surface C on at least one side thereof.

A second modified form A" of the tie is shown in FIG. 9 that is identical to form A other than that it includes an outwardly projecting member D that may removably engage an overhanging ledge or an inverted U-shaped member E.

Figure 11:
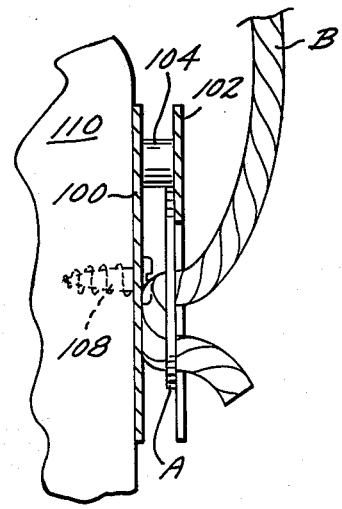
FIG. 11 is a transverse cross sectional view of the assembly taken on line 11—11 thereof.

In FIGS. 10 and 11 a tie engageable assembly S is shown that is mounted in abutting contact with a vertically extending surface T. Assembly S is defined by inner and outer rectangular plates 100 and 102 that are transversely spaced a distance greater than the thickness of one of the ties A. The plates 100 and 102 are transversely aligned and held in spaced relationship by a number of spacers 104.

The plates 100 and 102 have a number of transversely aligned openings 106 therein that are arranged as pairs and through which screws 108 extend to secure the inner plate 100 in abutting contact with a wall 110 that defines the exterior surface T.

The plates 100 and 102 have lower edges 100a and 102a. Outer plate 102 has at least one key hole shaped opening 112 extending upwardly from the lower surface thereof. Each of the openings 112 is defined by an upwardly extending channel 112a that develops into an enlarged circular portion 112b at the top thereof. The channel 112a is of slightly greater width than the diameter of the cord B. The opening portion 112b is of less cross sectional area than that of one of the ties A.

In FIG. 10 it will be seen that a tie A and cord B removably secured thereto may be moved upwardly in one of the openings B to dispose the tie in the space between the plates 100 and 102.

The tie A is now removably anchored to the assembly T and will not move if an upwardly directed force is exerted on the cord B to tension the latter. The tie A may be separated from the assembly S by relieving the tension and moving the tie and cord B downwardly in the opening 112.

The use and operation of the invention has been explained previously in detail and need not be repeated.

What is claimed is:

1. In combination with a pliable elongate member, a tie that may be removably secured to an end portion of said elongate member, said tie being a rigid sheet of material having a centered first opening and a plurality of circumferentially spaced second openings therein, said first and second openings of slightly greater diameter than said elongate member, said sheet having forward and rear side surfaces, and said tie removably secured to said elongate member when said end portion is advanced forwardly through said first opening and then rearwardly through one of said second openings, with said tie being removably anchored to said elongate member to resist separation therefrom when said elongate member is tensioned to a direction rearwardly of said tie, with there being a sufficient number of said second openings that said end portion may be extended therethrough to define at least one loop adjacent said forward surface, and said loop being compressed by said end portion when said elongate member is tensioned in a direction to force said end portion into contact with said loop, with at least said first opening and two of said second openings being axially aligned.

2. A tie as defined in claim 1 which in addition includes an engageable rigid member that projects forwardly from said forward surface of said tie.

3. A tie as defined in claim 1 which in addition includes a fastening assembly mountable on a wall surface and to which said tie may be removably secured, said fastening assembly including:

a. inner and outer transversely aligned rigid plates, said outer plate having at least one key holed shaped opening therein that extends inwardly from a side edge thereof and that includes a channel portion and an enlarged portion, said channel portion of a width greater than the diameter of said elongate member, and said enlarged portion of less cross sectional area than said tie;

b. first means that maintain said first and second plates parallel and in a spaced relationship greater than the thickness of said tie;

c. second means for mounting said assembly on said wall surface to permit said tie to be removably anchored thereto when said end portion has been moved through said channel portion to said enlarged portion and said tie is disposed between said first and second plates.

4. A tie as defined in claim 3 in which said second means are a plurality of screws that extend through openings in said inner plate to engage a body that defines said wall surface.

* * * * *